(12) United States Patent
Brown (10) Patent No.: US 9,132,783 B2
(45) Date of Patent: Sep. 15, 2015

(54) CARGO SUPPORTING APPARATUS (71) Applicant: Philip S. Brown, Rock Springs, WY (US)

(72) Inventor: Philip S. Brown, Rock Springs, WY (US)

( * ) Notice: Subject to any disclaimer, the term of this patent is extended or adjusted under 35 U.S.C. 154(b) by 0 days.

(21) Appl. No.: 14/018,582

(22) Filed: Sep. 5, 2013

(65) Prior Publication Data

US 2015/0059623 A1 Mar. 5, 2015

(51) Int. Cl.
A47B 23/00 (2006.01)
B60R 9/06 (2006.01)

(52) U.S. Cl.
CPC .......................................... B60R 9/06 (2013.01)

(58) Field of Classification Search
USPC ............... 108/42, 44, 45, 152, 46, 47, 48; 224/400, 489, 545
See application file for complete search history.

(56) References Cited

U.S. PATENT DOCUMENTS

| 1,662,293 | A | * | 3/1928 | Bennett | 108/152 |
| 2,550,172 | A | * | 4/1951 | Swalwell | 224/545 |
| 2,718,445 | A | * | 9/1955 | Wilson | 108/44 |
| 2,721,777 | A | * | 10/1955 | Willis | 108/44 |
| 2,746,821 | A | * | 5/1956 | Schroeder | 108/44 |
| 3,295,473 | A | * | 1/1967 | Wentworth | 108/152 |
| 4,089,276 | A | * | 5/1978 | Enos | 108/44 |
| 4,494,465 | A | * | 1/1985 | Fick, Jr. | 108/44 |
| 4,830,243 | A | * | 5/1989 | Mann | 108/44 |
| 5,033,448 | A | * | 7/1991 | Sandweg | 126/25 R |
| 6,474,244 | B1 | * | 11/2002 | Karpinski | 108/42 |
| 8,079,312 | B2 | * | 12/2011 | Long | 108/44 |
| 2010/0155444 | A1 | * | 6/2010 | Pedrini | 224/545 |

* cited by examiner

Primary Examiner — Jose V Chen
(74) Attorney, Agent, or Firm — Dale J. Ream (57) ABSTRACT

A cargo supporting apparatus for use with a support structure includes a framework having an upper frame member having opposed first and second ends and a lower frame member having opposed first and second ends, the first end of the lower frame member being coupled to the first end of the upper frame member. The second end of the lower frame member is selectively coupled to a first location on the support structure. The second end of the upper frame member is selectively coupled to a second location on the support structure.

11 Claims, 8 Drawing Sheets

Fig. 8b

CARGO SUPPORTING APPARATUS

BACKGROUND OF THE INVENTION

This invention relates generally to cargo supporting devices and, more particularly to a cargo supporting apparatus that may be installed on a support structure, such as a bumper on a recreational vehicle.

Having the ability to haul cargo on the outside of a vehicle is beneficial. Often, vehicles do not have sufficient interior cargo capacity. Even when vehicles have sufficient interior cargo capacity, it may be undesirable and even unsafe to transport cargo inside a vehicle. A generator is an example of cargo that should be hauled on the outside of a vehicle.

Recreational vehicles sometimes utilize external generators. Generators may be large and heavy, contain gasoline, and generate carbon monoxide. Consequently, most recreational vehicle owners haul generators on the outside of their recreational vehicles, often using a cargo supporting apparatus.

A common cargo supporting apparatus utilizes a receiver hitch. Cargo support apparatuses that utilize receiver hitches provide convenience because they are easy to install and remove, but they have several set-backs. First and foremost, they require the vehicle to have a receiver hitch. Second, utilizing the receiver hitch for a cargo support apparatus prevents the use of the receiver hitch for other purposes, such as for use as a towing hitch. Third, to accommodate the easy removability of the cargo supporting apparatus from the receiver hitch, the interface between the cargo supporting apparatus and receiver hitch is loose. This loose interface can allow the cargo support apparatus to bounce significantly on bumpy roads. Such a scenario could cause damage to the vehicle frame, the cargo apparatus, or the cargo itself. Finally, use of a receiver hitch is limiting because it only allows the cargo supporting apparatus to be installed at the location of the receiver hitch, which is typically located at the center of the rear bumper. In certain circumstances, such as when a ladder or spare tire is located on the back of a vehicle, it is beneficial to install a cargo supporting apparatus at a location away from the center of the rear bumper.

Cargo supporting apparatuses that do not utilize receiver hitches are often complicated or poorly built. A complicated cargo support apparatus is difficult to remove and install. Typically, a cargo support apparatus is only beneficial when it is needed for cargo. Consequently, it is beneficial for cargo supporting apparatuses to be easily removable when they are not in use. A cargo support apparatus that is poorly built, on the other hand, may come loose during use, potentially resulting in lost cargo and a road hazard.

Therefore, it would be desirable to have a cargo supporting apparatus that is easy to install and remove but that will not come loose during use and does not require the use of a receiver hitch. Further, it would be desirable to have a cargo supporting apparatus configured to leverage cargo so as to minimize risk of breaking or becoming dislodged from a support structure. The present invention fulfills this need.

SUMMARY OF THE INVENTION

A cargo supporting apparatus for use with a support structure according to the present invention includes a framework having an upper frame member having opposed first and second ends and a lower frame member having opposed first and second ends, the first end of the lower frame member being coupled to the first end of the upper frame member. The second end of the upper frame member is selectively coupled to a first location on the support structure. The second end of the lower frame member is selectively coupled to a second location on the support structure.

Therefore, a general object of this invention is to provide a cargo supporting apparatus configured to be coupled to a support structure such as the bumper of an automobile, camper, or the like.

Another object of this invention is to provide a cargo supporting apparatus, as aforesaid, that includes a clamping assembly that is unlikely to come loose once coupled to a support structure such as a vehicle bumper.

Still another object of this invention is to provide a cargo supporting apparatus, as aforesaid, that is easy to install or remove from a vehicle bumper.

Yet another object of this invention is to provide a cargo supporting apparatus that is inexpensive to manufacture.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 1b is a side elevation view of the cargo support apparatus as in FIG. 1a;

FIG. 8a is a top view of the cargo support apparatus as in FIG. 1a; and

FIG. 8b is a sectional view taken along line 8b-8b of FIG. 8a.

DESCRIPTION OF THE PREFERRED EMBODIMENT

Figure 1A:
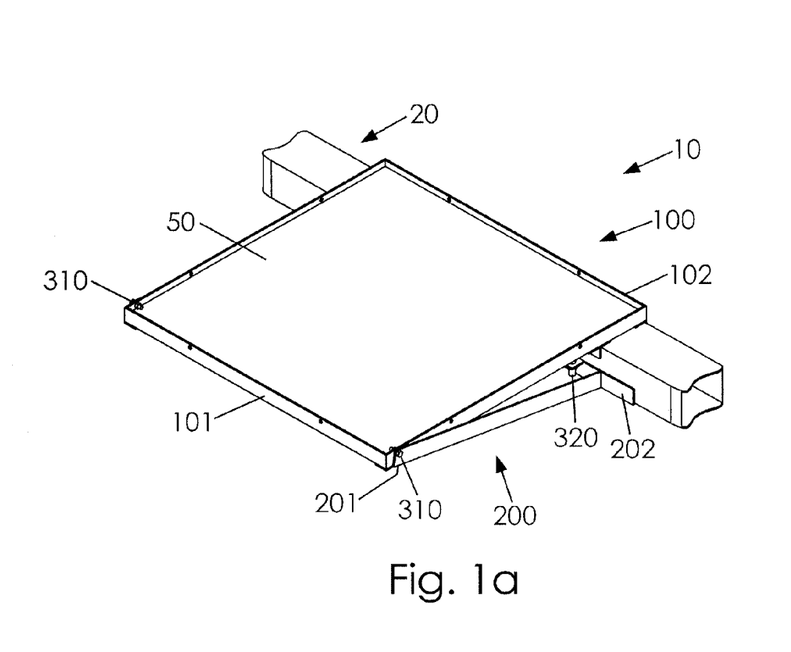
FIG. 1a is a perspective view of a cargo support apparatus according to a preferred embodiment of the present invention and illustrated coupled to the bumper of a vehicle.
Figure 1B:
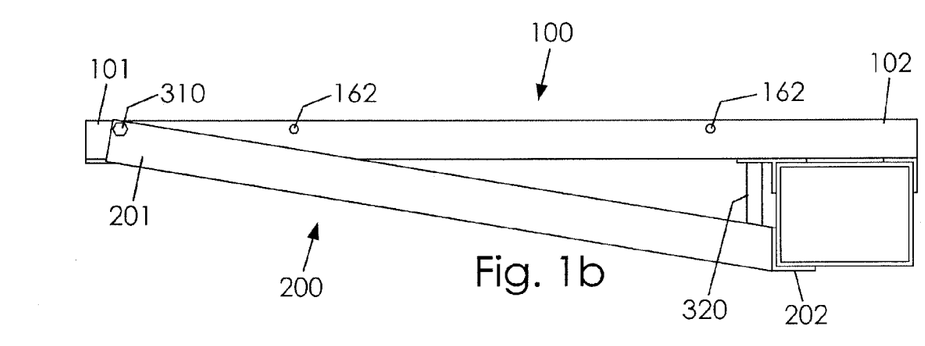

A cargo support apparatus 10 according to the present invention will now be described with reference to FIGS. 1 through 8b of the accompanying drawings. In its preferred embodiment, the cargo support apparatus 10 is oriented, as shown in FIG. 1, so that an upper frame member 100 is situated in a generally horizontal plane relative to a support structure 20. Alternatively, the cargo support apparatus 10 may be oriented so that the upper frame member 100 is situated in a general plane at any angle relative to the support structure 20, including in a generally vertical plane. The support structure 20 may be a vehicle bumper, such as the bumper of a camping trailer, although other non-mobile support structures are also contemplated.

The cargo support apparatus 10 includes the upper frame member 100 and a lower frame member 200. The cargo support apparatus 10 may also include a platform 50. The platform 50 may be permanently installed onto the upper frame member 100, may be removable from the upper frame member 100, or may be integrated into the upper frame member 100.

The upper frame member 100 may include a pair of opposed platform end support members 152 and a pair of opposed platform side support members 154 (later referred to as horizontal support members 154). Together, the platform support members 152, 154 define a central void 156. In another embodiment, the upper frame member 100 may include intermediate support members positioned within the void 156 and extending between respective side support members 154.

Figure 2:
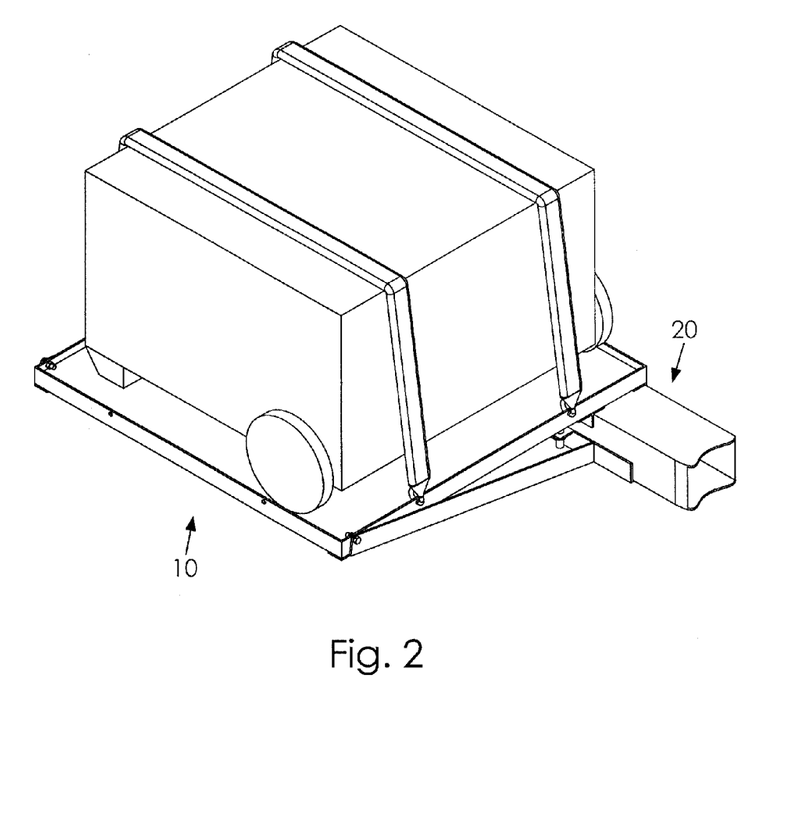
FIG. 2 is a perspective view of the cargo support apparatus, as in FIG. 1a, illustrated supporting a generator.

The platform support members 152, 154 combine to create a peripheral shelf 150 and a peripheral lip 160. The peripheral shelf 150 may be formed by horizontally extending portions of the platform support members 152, 154 the shelf 150 being configured to selectively support the platform 50. The peripheral lip 160 extends upwardly from the platform support members 152, 154 and may be configured so as to retain the platform 50 atop the shelf 150 and the cargo positioned upon the platform 50. The peripheral lip 160 may also support spaced apart cargo attachment locations 162. The preferred embodiment includes cargo attachment locations 162 that are defined by spaced apart apertures in the peripheral lip 160 (FIGS. 1 and 2). It is recognized, however, that the spaced apart cargo attachment locations 162 may be located virtually anywhere on the cargo support apparatus 10.

Figure 3:
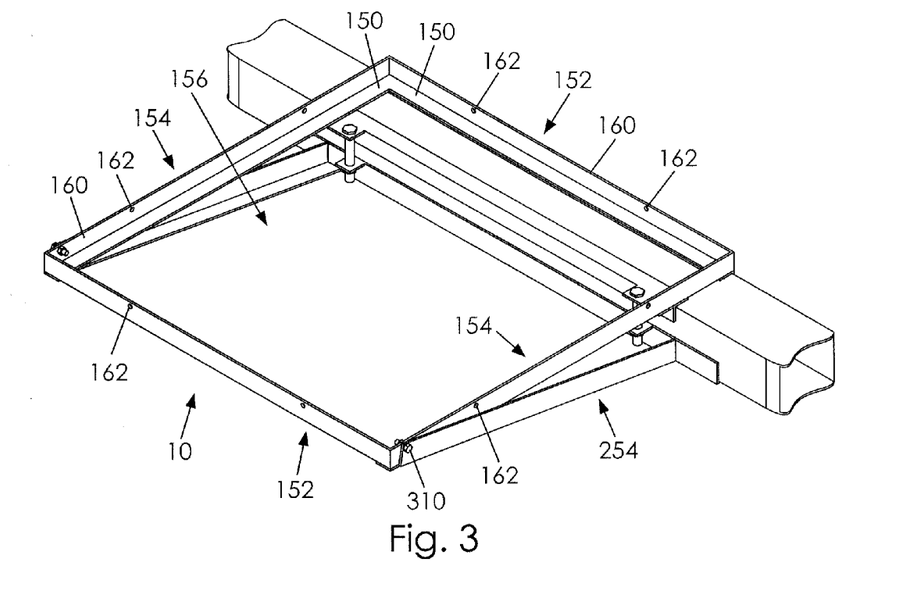
FIG. 3 is a perspective view of the cargo support apparatus, as in FIG. 1a, with a platform removed.

The upper frame member 100 includes a first end 101 and a second end 102 (FIG. 3). The second end 102 includes a first fastening member 110 and a second fastening member 112 (both of which are later referred to as L-shaped fastening members). The respective fastening members 110, 112 are coupled to horizontal support members 154 at the second end 102 of the upper frame member 100. The first end 101 may include a bearing plate 158 installed on each horizontal support member 154. It is understood that the number of horizontal support members 154 may vary, but at least one horizontal support member 154 is necessary.

The lower frame member 200 includes a first end 201 and a second end 202 (FIG. 3). The second end 202 includes a fastening member 210 (later referred to as an L-shaped fastening member). The fastening member 210 is coupled to angled support members 254 at the second end 202 of the lower frame member 200. The first end 201 includes a bearing flange 258 integrated into each angled support member 254. In another embodiment, the bearing flanges 258 may be designed as independent pieces that are coupled to the angled support members 254. It is understood that the number of angled support members 254 may vary as necessary.

Figure 4:
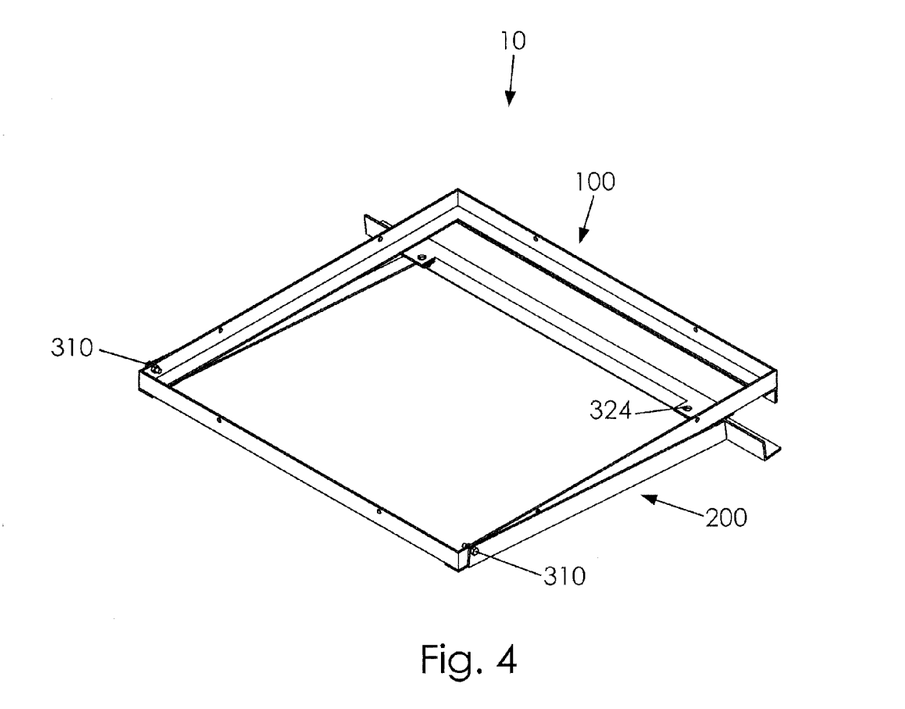
FIG. 4 is a perspective view of the cargo support apparatus, as in FIG. 3, shown removed from the bumper and collapsed for storage.
Figure 5:
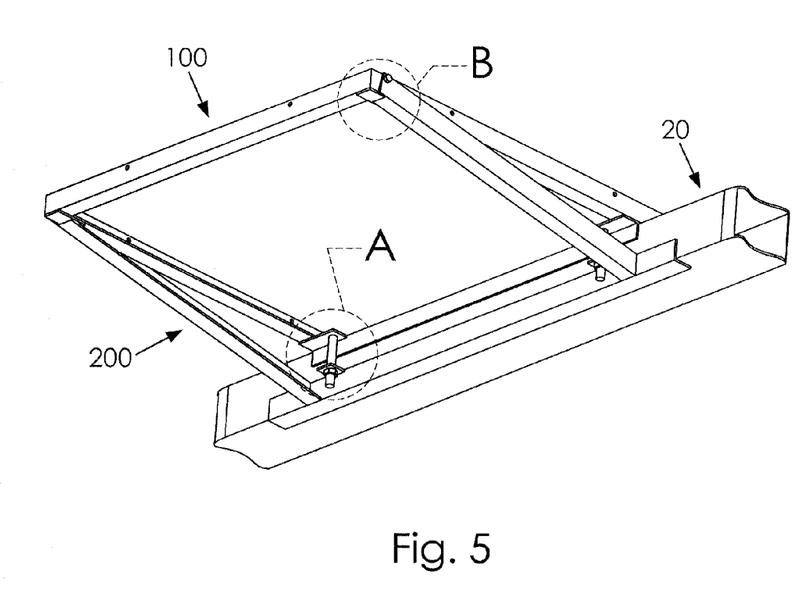
FIG. 5 is a perspective view of the cargo support apparatus, as in FIG. 3, shown from a different angle than FIG. 3.
Figure 6:
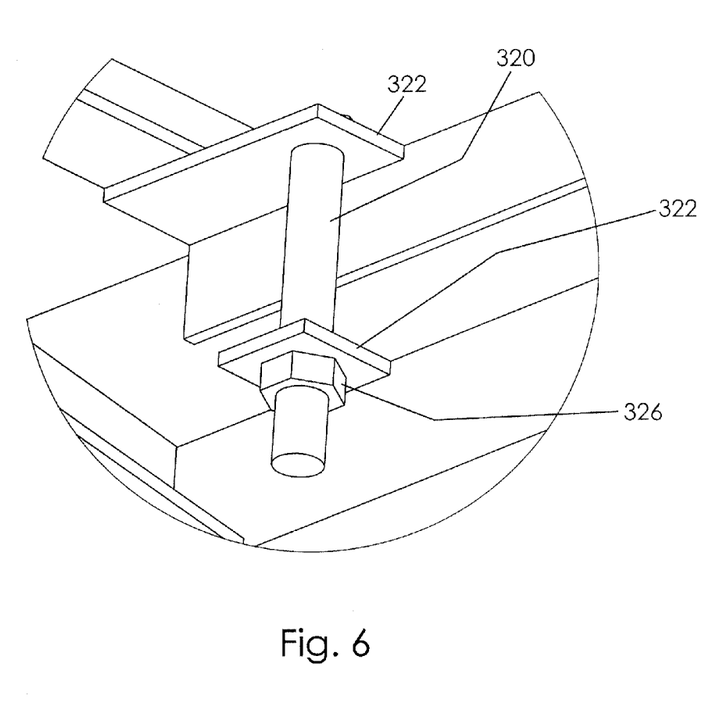
FIG. 6 is an isolated view on an enlarged scale taken from FIG. 5.
Figure 7:
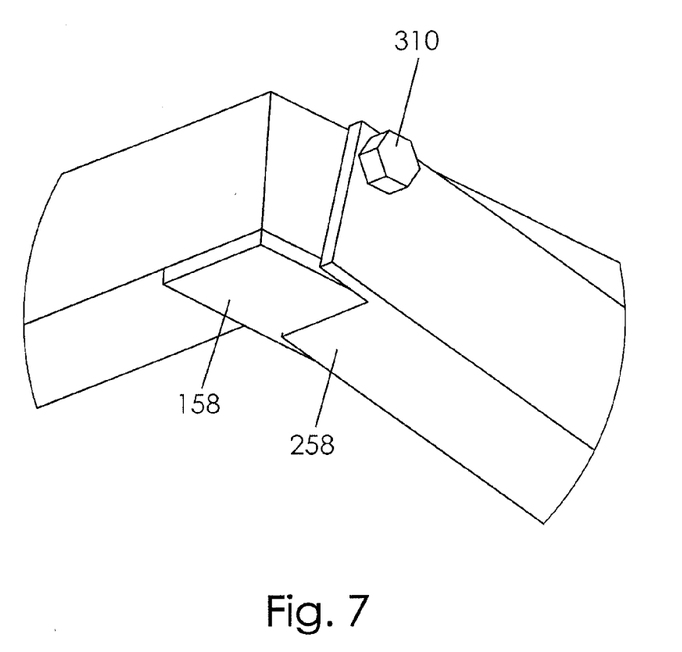
FIG. 7 is an isolated view on an enlarged scale taken from FIG. 5.

The lower frame member 200 may be pivotally coupled to the upper frame member 100 at their respective first ends 201, 101 (FIGS. 3 and 4). FIG. 3 shows the lower frame member 200 pivoted to a position that is suitable for the cargo support apparatus 10 to couple with the support structure 20. FIG. 4 shows the lower frame member 200 pivoted to a position that may be more suitable for storage and shipping of the cargo support apparatus 10. The preferred embodiment utilizes two coaxial cylindrical fasteners 310 to attach the lower frame member 200 to the upper frame member 100 at their respective first ends 101, 201. In another embodiment only one such cylindrical fastener 310 may be necessary. In still another embodiment more than two such coaxial cylindrical fasteners 310 may be utilized. Alternatively, the frame members 100, 200 may be coupled together utilizing a variety of common hinging mechanisms, some of which may not require any cylindrical fasteners 310.

Figure 8A:
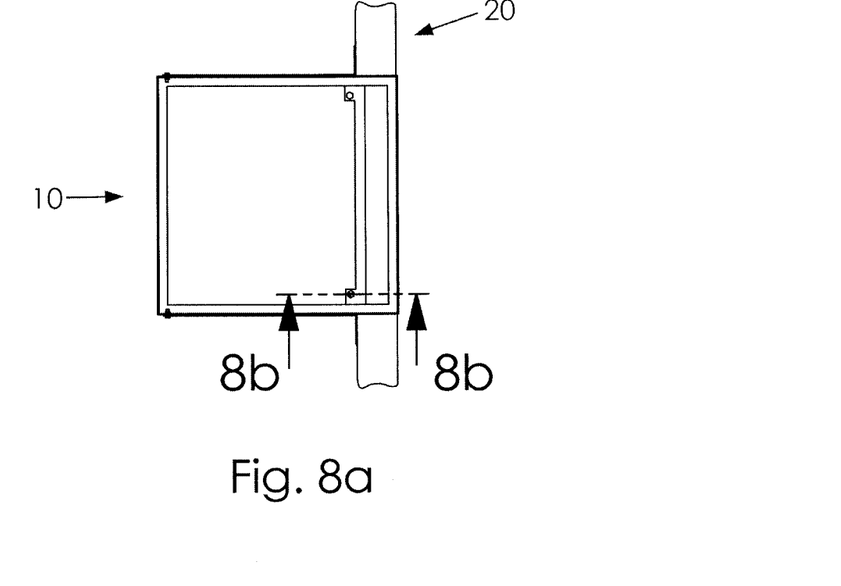
Figure 8B:
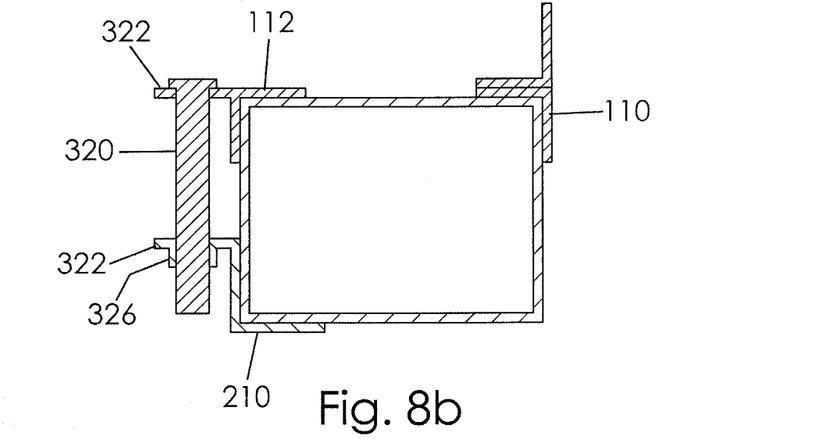

As shown in FIG. 8a, the second end 102 of the upper frame member 100 may be configured to be selectively coupled to a first location on the support structure 20. Similarly, the second end 202 of the lower frame member 200 may be configured to be selectively coupled to a second location on the support structure 20. In the preferred embodiment, as shown in FIG. 1, the first location on the support structure 20 is an upper portion of the support structure 20 and the second location on the support structure 20 is a lower portion of the support structure 20. Alternatively, either or both of the respective second ends 102, 202 of the respective frame members 100, 200 may be configured to selectively couple to different portions of the support structure 20 or they may be configured to selectively couple to intermediate structure.

The second end 102 of the upper frame member 100 includes two L-shaped fastening members 110 configured to selectively couple to the first location on the support structure 20. Similarly, the second end 202 of the lower frame member 200 includes an L-shaped fastening member 210 configured to be selectively coupled to the second location on the support structure 20. It is understood that the respective second ends 102, 202 of the respective frame members 100, 200 may include any common design configuration necessary to selectively couple to the support structure 20 or the intermediate structure.

The L-shaped fastening member 210 of the lower frame member 200 is installed at a predetermined angle relative to the angled support members 254 of the lower frame member 200 (FIG. 8a). Preferably, the predetermined angle is about 15 degrees. It is understood, however, that other angles may be necessary for different uses and configurations. An appropriate predetermined angle for a particular use and configuration may be calculated by taking into account the dimensions of the cargo support apparatus and/or the dimensions of the support structure 20. Alternatively, a predetermined angle may be acquired through the process of trial and error or any other appropriate means of obtaining an appropriate angle for a particular use and configuration.

Returning to the operative coupling of the respective first ends 101, 201 of the respective frame members 100, 200, the first end 201 of the lower frame member 200 may be urged upwardly against the first end 101 of the upper frame member 100 when the respective second ends 102, 202 of the respective frame members 100, 200 are selectively coupled to the support structure 20. As the first end 201 of the lower frame member 200 is urged upwardly against the first end 101 of the upper frame member 100, the first end 201 of the lower frame member 200 may bear against the first end 101 of the upper frame member 100 with a measurable force. More particularly, the bearing flange 258 is urged into increasingly wedged contact with bearing plate 158 (FIG. 7) as the upper and lower frame members 100 and 200 are increasingly tightened together via fastening member 320. The offset angle of fastening member 210 is moved into increasingly flush relation to support structure 20 as shown in FIG. 8 as the second ends 102, 202 are tightened together by fastening member 320.

This measurable force may vary depending on the predetermined angle between the L-shaped fastening member 210 relative to the angled support members 254. This measurable force between the respective first ends 101, 201 of the respective frame members 100, 200 may also be variable relative to progressive coupling of the respective second ends 102, 202 of the respective frame members 100, 200. The opposed clamping flanges 322 are coupled to the respective second ends 102, 202 of the respective frame members 100, 200. Each clamping flange 322 may include an aperture 324 to accommodate a threaded fastener 320. In one embodiment, a threaded nut 326 may be coupled to one or more of the clamping flanges 322. In another embodiment, one or more of the clamping flanges 322 may include threaded apertures 324.

In the preferred embodiment, two threaded fasteners 320 are utilized to progressively couple respective frame members 100, 200 together at their respective second ends 102, 202. In another embodiment, only one such threaded fastener 320 may be necessary. In still another embodiment more than two such threaded fasteners 320 may be utilized. Alternatively, the respective frame members 100, 200 may be coupled together at their respective second ends 102, 202 utilizing a variety of common force generating mechanisms such as springs or clamps, some such mechanisms not requiring any threaded fasteners 320.

In one embodiment, the second end 202 of the lower frame member 200 may be progressively coupled to the second end 102 of the upper frame member such that the first end 201 of the lower frame member 200 is increasingly urged upwardly as respective second ends 102, 202 of the respective frame members 100, 200 are increasingly coupled more tightly together. Consequently, in the preferred embodiment, the measurable force between the respective first ends 101, 201 of the respective frame members 100, 200 may vary in relation to the progressive coupling of the respective second ends 102, 202 of the respective frame members 100, 200. Additionally, as the threaded fasteners progressively couple the respective second ends 102, 202 of the respective frame members 100, 200 together, each set of opposing clamping flanges 322 may generate an increasing resistance force opposing the increased coupling force generated by tightening the threaded fasteners 320.

In use, the cargo apparatus 10 may be coupled to a support structure 20 such as a vehicle bumper as described above. Specifically, the second ends of the upper and lower frame members may be selectively coupled to the support structure 20. Cargo, such as a generator, cooler, or other articles may be loaded atop the cargo apparatus 10 once mounted and is maintained securely thereon. The cargo apparatus 10 may be selectively removed by uncoupling the second ends, pivoting the frame members to a collapsed configuration, and stowing the apparatus 10 for storage or transport.

It is understood that while certain forms of this invention have been illustrated and described, it is not limited thereto except insofar as such limitations are included in the following claims and allowable functional equivalents thereof.

What is claimed is:

1. A cargo supporting apparatus for use with a support structure, comprising:
   a framework having an upper frame member having opposed first and second ends and a lower frame member having opposed first and second ends, said first end of said lower frame member being operatively coupled to said first end of said upper frame member;
   wherein:
      said second end of said upper frame member includes at least one L-shaped fastening member configured to selectively couple said second end of said upper frame member to an upper portion of the support structure; and
      said second end of said lower frame member includes at least one L-shaped fastening member configured to selectively couple said second end of said lower frame to a lower portion of the support structure;
      said L-shaped fastening member of said lower frame member is offset at a predetermined angle relative to said lower support member such that said first end of said lower frame member is progressively urged upwardly against said first end of said upper frame member when said respective second ends of said lower and upper frame members are increasingly more tightly coupled together via a threaded fastener.

2. The cargo supporting apparatus of claim 1, wherein said first end of said lower frame member is pivotally coupled to said first end of said upper frame member.

3. The cargo supporting apparatus of claim 1, wherein said upper frame member is situated in a generally horizontal plane relative to the support structure.

4. The cargo supporting apparatus of claim 3, further comprising a platform operatively coupled to said upper frame member.

5. The cargo supporting apparatus of claim 4, wherein said platform is selectively removable from said upper frame member.

6. The cargo supporting apparatus of claim 4, wherein said upper frame member includes a peripheral shelf configured to selectively support said platform.

7. The cargo supporting apparatus of claim 6, wherein said upper frame member includes an upwardly extending peripheral lip so as to retain cargo positioned upon said platform.

8. The cargo supporting apparatus of claim 7, wherein said peripheral lip includes spaced apart cargo attachment locations.

9. The cargo supporting apparatus of claim 1, wherein:
   said upper frame member includes a generally rectangular configuration having a pair of opposed side support members and a pair of end support members that, together, define a central void; and
   said lower frame member includes a generally rectangular configuration having a pair of opposed side support members and a single end support member that, together, define a central void.

10. The cargo supporting apparatus of claim 1, wherein:
    said first end of said upper frame member includes a bearing plate;
    said first end of said lower frame member includes a bearing flange;
    said bearing flange is urged into increasingly wedged contact with said bearing plate as said second end of said upper frame member and said second end of said lower frame member are increasingly tightened together by operative actuation of said threaded fastening member.

11. The cargo supporting apparatus of claim 10, wherein said L-shaped fastening member of said lower frame member is moved into an increasingly flush relationship relative to said lower portion of the support structure as said second end of said upper frame member and said second end of said lower frame member are increasingly tightened together by operative actuation of said threaded fastening member.

* * * * *